US006181650B1

(12) United States Patent
Ichihara

(10) Patent No.: US 6,181,650 B1
(45) Date of Patent: Jan. 30, 2001

(54) OPTICAL DISK DRIVE AND SUPER-RESOLUTION REPRODUCTION METHOD FOR OPTICAL DISK

(75) Inventor: Katsutaro Ichihara, Yokohama (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 09/044,830

(22) Filed: Mar. 20, 1998

(30) Foreign Application Priority Data

Mar. 21, 1997 (JP) .................................................. 9-068704

(51) Int. Cl.[7] ....................................................... G11B 7/00
(52) U.S. Cl. ............................................................... 369/13
(58) Field of Search .......................... 369/13, 120, 44.37

(56) References Cited

U.S. PATENT DOCUMENTS 4,853,912 * 8/1989 Akasaka et al. ...................... 369/13
4,888,750 * 12/1989 Kryder et al. ........................ 369/13
5,093,822 * 3/1992 Kugiya et al. ........................ 369/13
5,717,662 * 2/1998 Nishimura ............................ 269/13
5,740,133 * 4/1998 Tamanoi et al. ...................... 369/13
5,830,589 * 11/1998 Nishimura ............................ 369/13
5,966,350 * 10/1999 Tanaka et al. ........................ 369/13
5,995,472 * 11/1999 Fujii et al. ........................... 369/13
6,018,511 * 1/2000 Nishikiori et al. .................... 369/13

OTHER PUBLICATIONS

Proc. Joint ISOM/OPS Conference '93 Th 3.2 "Premastered Optical Disk by Superresolution" K. Yasuda et al.
Proc. ISOM '95, We–C1 ' Super Resolution Using Variable Transmittance Detection, M. Kuroda; 1995.

* cited by examiner

*Primary Examiner*—Nabil Hindi
(74) *Attorney, Agent, or Firm*—Pillsbury Madison & Sutro LLP

(57) ABSTRACT

An optical disk drive for reproducing an optical disk having a recording layer and a super-resolution film provided on a reproduction-beam incident side with respect to the recording layer, the super-resolution film being formed of such a material that an optical aperture formed by irradiation of a reproduction beam remains after the reproduction beam passes. The optical disk drive comprises a reproduction light source for generating the reproduction beam, a reproduction optical system for detecting a reproduction beam having been incident to the recording layer via the optical aperture formed in the super-resolution film, and reflected from the recording layer, and an initialization light source, provided at a back of the reproduction light source in a track direction of the optical disk, for generating an initialization beam for closing the optical aperture remaining on the super-resolution film.

8 Claims, 6 Drawing Sheets

201
101
301
202
302
10
104

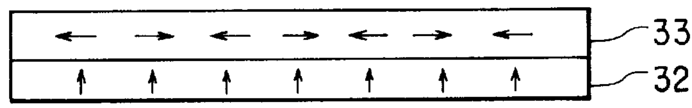
FIG. 5
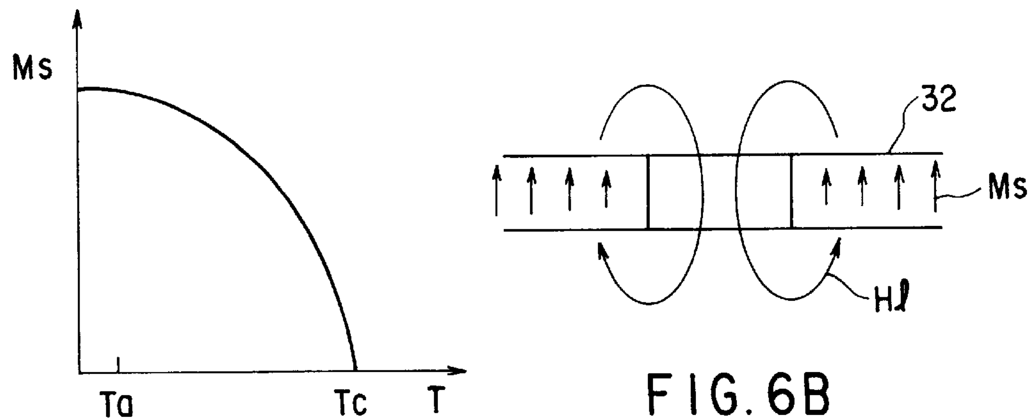
FIG. 6B
FIG. 6A
Tr
Hℓ
FIG. 7
32
FIG. 8
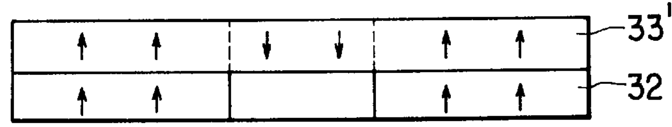
FIG. 9

OPTICAL DISK DRIVE AND SUPER-RESOLUTION REPRODUCTION METHOD FOR OPTICAL DISK

BACKGROUND OF THE INVENTION

The present invention relates to an optical disk drive and a super-resolution reproduction method for an optical disk.

Optical disk memories, which accomplish information reproduction alone or information recording and reproduction by irradiation of a light beam, have been put to practical use, as high-capacity, fast-access and portable storage media, in various files, such as audio data, image data and computer data. It is expected that development of those memories will continue. There may be several schemes available to increase the density of optical disks, such as shortening the wavelength of a gas laser for cutting a master, shortening the wavelength of a semiconductor laser as an operational light source, increasing the numerical aperture of an objective lens and making optical disks thinner. With regard to recordable optical disks, various other approaches are possible: mark length recording, and land/grove recording.

As a scheme having a great effect on improvement on the density of optical disks, a super-resolution reproduction technique which uses a medium film has been proposed. The super-resolution reproduction was originally proposed as a scheme specific to magneto-optical disks. In the super-resolution reproduction for magneto-optical disks, a magnetic film (super-resolution film) is provided on the reproduction-beam incident side with respect to the recording layer so as to cause exchange coupling or magnetostatic coupling between them. Then, a reproduction beam is irradiated to raise the temperature of the super-resolution film to change the exchange force or magnetostatic force, thereby forming an optical aperture or optical mask in the super-resolution film to realize super-resolution reproduction.

Later, for ROM disks in addition to MO disk, was reported an attempt to provide a super-resolution film whose light transmittance varies with the irradiation of a reproduction beam, on the reproduction-beam incident side with respect to the recording layer for the purpose of super-resolution reproduction. It has become obvious that super-resolution reproduction can be adapted to all optical disks like a magneto-optical disk, CD-ROM, CD-R, WORM and a phase change optical disk.

Implementation of super-resolution reproduction of optical disks requires that the transmittance of the super-resolution film should change by a significant amount with practical reproduction power, an optical aperture should be formed fast in as a short period as the pass time of the reproduction beam spot, and repeated reproduction should be accomplished stably. Prior arts cannot however meet all of those requirements.

BRIEF SUMMARY OF THE INVENTION

Accordingly, it is an object of the present invention to ensure super-resolution reproduction of an optical disk under practical conditions and achieve high density of an optical disk.

An optical disk drive according to this invention is designed to reproduce an optical disk having a recording layer and a super-resolution film provided on a reproduction-beam incident side with respect to the recording layer, the super-resolution film being formed of such a material that an optical aperture formed by irradiation of a reproduction beam remains after the reproduction beam passes, and comprises a reproduction light source for generating the reproduction beam; a reproduction optical system for detecting a reproduction beam having been incident to the recording layer via the optical aperture formed in the super-resolution film, and reflected from the recording layer; and an initialization light source, provided at a back of the reproduction light source in a track direction of the optical disk, for generating an initialization beam for closing the optical aperture remaining on the super-resolution film.

A super-resolution reproduction method using this optical disk drive comprises a step of irradiating a reproduction beam to form an optical aperture in the super-resolution film, a step of detecting a reproduction beam having been incident to the recording layer via the optical aperture, and reflected from the recording layer, and a step of irradiating an initialization beam to close the optical aperture remaining on the super-resolution film prior to irradiation of the next reproduction beam.

A super-resolution reproduction method according to this invention reproduces an optical disk having a recording layer and a super-resolution film provided on a reproduction-beam incident side with respect to the recording layer, the super-resolution film being comprised of a field control film which is demagnetized by irradiation of a reproduction beam and a magnetization change film whose magnetization direction changes due to an influence of a magnetic field of the field control film, and comprises the steps of irradiating a polarized reproduction beam to change magnetizations of the field control film and the magnetization change film, thereby rotating a polarization plane of the polarized reproduction beam; and detecting the polarized reproduction beam having been incident to the recording layer via the field control film and the magnetization change film, and reflected from the recording layer.

Another optical disk drive according to this invention reproduces an optical disk having a recording layer and a super-resolution film provided on a reproduction-beam incident side with respect to the recording layer, the super-resolution film being comprised of a photoconductive film which becomes conductive with irradiation of a reproduction beam, a switching film for producing an optical aperture when applied with an electric field equal to or greater than threshold strength, and a pair of conductive films for applying an electric field to a stack of the photoconductive film and the switching film, and comprises a power supply for applying the electric field to the stack of the photoconductive film and the switching film through the pair of conductive films; a reproduction light source for generating the reproduction beam; and a reproduction optical system for detecting a reproduction beam having been incident to the recording layer via the optical aperture formed in the switching film, and reflected from the recording layer.

A super-resolution reproduction method using this optical disk drive comprises a step of irradiating a reproduction beam to form an optical aperture in the switching film while applying an electric field to the stack of the photoconductive film and the switching film via the pair of conductive films, and a step of detecting a reproduction beam having been incident to the recording layer via the optical aperture and reflected from the recording layer.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a diagram showing a super-resolution film having the stack of a field control film and a magnetization change film, which is used in an optical disk according to this invention;

FIG. 6A is a diagram depicting the temperature dependency of saturation magnetization of the field control film to be used in this invention, and FIG. 6B is a diagram showing the distribution of saturation magnetization in the field control film;

FIG. 7 is a diagram showing the relationship between an external magnetic field to be applied to the magnetization change film to be used in this invention and the transmittance of the magnetization change film;

FIG. 8 is a diagram of another field control film to be used in this invention;

FIG. 9 is a diagram showing a super-resolution film having the stack of a field control film and a magnetization change film, which is used in this invention;

DETAILED DESCRIPTION OF THE INVENTION

The present invention will now be described more specifically.

To begin with, the principle of super-resolution reproduction will be discussed. Super-resolution reproduction has two general modes: heat mode and photon mode. A super-resolution film which is one constituent of an optical disk according to this invention operates in one of the modes. In heat mode, a super-resolution film made of a material whose transmittance varies with the temperature is used, and an optical aperture with a high transmittance is formed in an area whose temperature has risen by the irradiation of a reproduction beam. In photon mode, a super-resolution film made of a material whose transmittance varies with the number of photons to be irradiated is used, and an optical aperture with a high transmittance is formed in an area which has a large number of photons in a reproduction beam spot.

Figure 1:
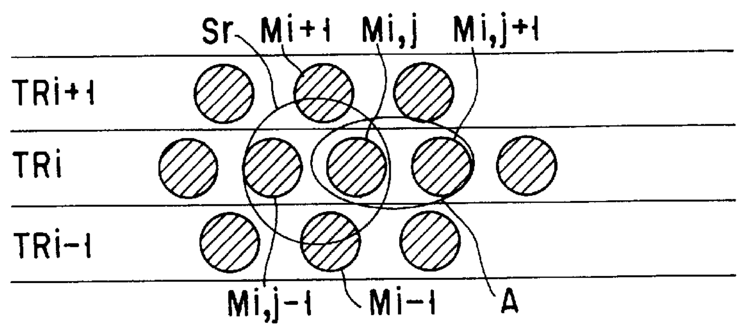
FIG. 1 is a diagram illustrating the principle of super-resolution reproduction in heat mode.
Figure 2:
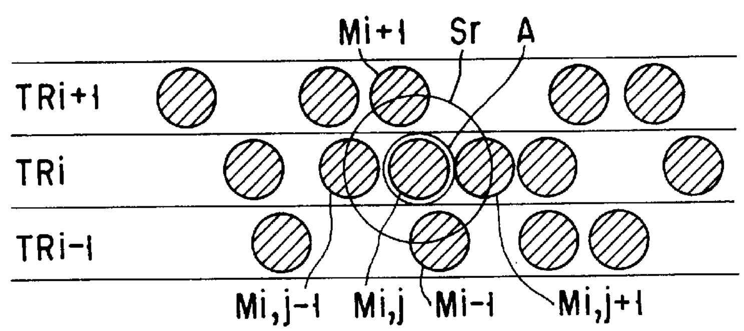
FIG. 2 is a diagram illustrating the principle of super-resolution reproduction in photon mode.

Referring to FIGS. 1 and 2, the relationship among marks recorded on the recording layer, the reproduction spot and the optical aperture of the super-resolution film will be explained. FIG. 1 shows the case of the heat mode, while FIG. 2 shows the case of the photon mode. $TR_{i-1}$, $TR_i$ and $TR_{i+1}$ are three adjacent recording tracks. M denotes a recorded mark, with the subscription i indicating the track where the mark is recorded while the subscriptions j-1, j and j+1 are arbitrary numbers indicating the order of the recording marks in an associated track. Sr indicates the reproduction spot, and A the aperture of the super-resolution film. As the recording beam has a large power level, a sufficiently large optical aperture is formed in the super-resolution film at the time of irradiation of the recording beam most of which reaches the recording layer to form a recorded mark. Those diagrams show the case where recording marks are recorded at narrower mark pitches and narrower track pitches than those of an ordinary medium which has no super-resolution film.

In the ordinary reproduction method, all the recording marks in the reproduction spot Sr contribute to a reproduction signal. Let us consider the case where a recorded mark $M_{i,j}$ is to be reproduced. In this case, $M_{i,j-1}$, on the same track contributes to the reproduction signal, so that an inter-symbol interference occurs. As $M_{i-1}$ and $M_{i+1}$ on adjacent tracks contribute to the reproduction signal, a crosstalk occurs.

As shown in FIGS. 1 and 2, when an area with a high transmittance or the aperture A is formed in the super-resolution film, the reproduction beam is irradiated onto the recording layer via the aperture A. Because the other areas of the super-resolution film than the aperture A have a low transmittance, substantially the reproduction beam is not irradiated on the recording layer. Therefore, what contributes to the reproduction signal is only the recorded mark $M_{i,j}$ present in the portion where the reproduction spot Sr overlaps the aperture A formed in the super-resolution film.

As shown in FIG. 1, an elliptical aperture A (more precisely, one having the shape of a droplet with a wide portion lying closer to the reproduction spot) is formed in the super-resolution film in heat mode, shifted rearward (rightward in FIG. 1) along the track direction with respect to the reproduction spot Sr. This occurs due to a time delay to the rising of the temperature of the super-resolution film from the irradiation of the reproduction spot when the disk is rotated fast. As regards the super-resolution film in photon mode, as shown in FIG. 2, the number of photons to be irradiated is large near the center portion of the reproduction spot Sr (the number of photons indicates a Gaussian distribution), so that a circular aperture A is formed.

Figure 3:
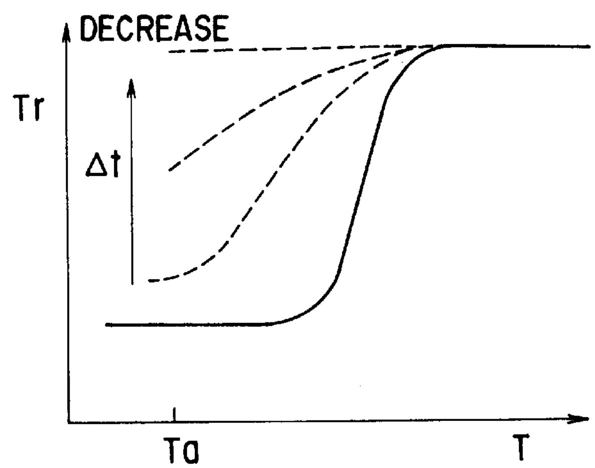
FIG. 3 is a diagram showing the relationship between the temperature and transmittance of a super-resolution film which is used in an optical disk according to this invention.

FIG. 3 shows the relationship between the temperature (T) and transmittance (Tr) of a super-resolution film in heat mode. As indicated by the solid line in this figure, the transmittance Tr is, for example, 50% which is low, at an ambient temperature Ta (near the room temperature). When the reproduction beam is irradiated, the transmittance Tr increases up to, for example, 90%, forming an aperture, as the temperature of the super-resolution film rises.

The prior art was premised on, for the super-resolution film, the selection of a material whose response speed from the beginning of the irradiation of a reproduction beam to the point of transmittance increase is fast and whose transmittance promptly returns to a value of the point before the irradiation of the reproduction beam after the reproduction beam passes.

The curves indicated by the broken lines in FIG. 3 show the characteristics of a material whose transmittance does not return to a value of the point before temperature increase and has a higher value than the former value, when the cooling time Δt after the temperature increase of the super-resolution film is short. From the conventional selection criteria, the material showing the broken-line characteristics in FIG. 3 is inadequate for a super-resolution film. This is because when the linear velocity of an optical disk is fast and the cooling time is short, a part of an aperture formed in a super-resolution film, made of such a material, by the irradiation of a reproduction beam remains open which is considered inconvenient for repetitive reproduction. This invention can permit a super-resolution film to be formed of a material which has a hysteresis in transmittance and extends the freedom of material selection and media design.

Reproduction from an optical disk having such a super-resolution film is implemented by using an optical disk drive which comprises an a reproduction light source for generating a reproduction beam, a reproduction optical system for detecting a reproduction beam having been incident to the recording layer via an optical aperture formed in the super-resolution film, and reflected from the recording layer, and an initialization light source, provided at a back of the reproduction light source in a track direction of the optical disk, for generating an initialization beam for closing the optical aperture remaining on the super-resolution film.

Super-resolution reproduction by this optical disk drive is carried out as follows. First, a reproduction beam is irradiated on the super-resolution film to form an optical aperture, a reproduction beam is irradiated on the recording layer via the optical aperture and the reproduction beam reflected from the recording layer is detected for reproduction. Then, before irradiation of the next reproduction beam, the remaining optical aperture is closed by an initialization beam. This method can adequately accomplish repetitive reproduction.

Materials which have the characteristics indicated by the broken lines in FIG. 3 include a phase change material, an organic material and a liquid crystal material. A description will now be given of a case where a phase change material which has a long crystallization time is used for a super-resolution film and the pass time of a beam spot is shorter than the crystallization time.

Figure 4A:
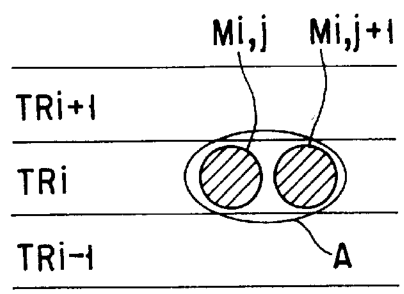
FIG. 4A is a diagram depicting the optical state of an optical disk before the initialization of the super-resolution film.
Figure 4B:
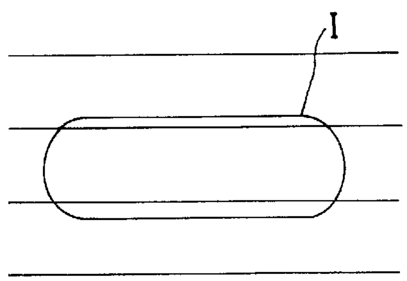
FIG. 4B is a diagram depicting an initialization beam spot I and the optical state of an optical disk after the initialization of the super-resolution film.

FIG. 4A shows the optical state of an optical disk before initialization of the super-resolution film, and FIG. 4B depicts an initialization beam spot I and the optical state of an optical disk after the initialization of the super-resolution film. As shown in FIG. 4A, at least a part of an aperture A formed by a reproduction operation remains open before initialization, and recording marks are seen through the remaining aperture A. As shown in FIG. 4B, the initialization beam spot I has, for example, an elliptical shape extending along the track direction, and has enough heating and cooling times to crystallize the super-resolution film. After the initialization beam spot I passes, the transmittance of the super-resolution film drops and returns to the original, low level of the solid line in FIG. 3. This can permit adequate super-resolution reproduction in the next reproduction operation. Note that even a circular spot can be employed if the power of the initialization beam is set properly.

This invention allows a super-resolution film to be formed of a material which has such characteristics that the transmittance decreasing speed after the passing of the reproduction beam is slow as well as the transmittance increasing speed from the beginning of the irradiation of the reproduction beam is slow and so the response in forming an optical aperture is slow. From the conventional selection criteria, such a material is also inadequate for a super-resolution film for the following reason. Because it takes time for the transmittance of the super-resolution film to increase from the point of the irradiation of a reproduction beam, when the linear velocity of an optical disk is fast, an aperture is formed after the reproduction beam passes, making reproduction itself impossible.

Materials which show a slow increase in transmittance by the irradiation of a light beam and a slow response in forming an optical aperture include a chalcogen-based material like As—Se—Ge, and an organic material. Those materials have not been used for a super-resolution film though they exhibit large changes in transmittance.

Reproduction from an optical disk having such a super-resolution film is carried out by using an optical disk drive which comprises a pre-beam light source, provided in front of the reproduction light source in the track direction, for generating a pre-beam for forming an optical aperture, in addition to the reproduction light source, the reproduction optical system and the initialization light source.

Super-resolution reproduction by this optical disk drive is executed as follows. First, a pre-beam is irradiated on the super-resolution film to form an optical aperture. Then, a reproduction beam is irradiated on the recording layer via the optical aperture and the reproduction beam reflected from the recording layer is detected for reproduction. Then, before irradiation of the next reproduction beam, the remaining optical aperture is closed by the irradiation of an initialization beam.

In this case, reproduction is conducted with the reproduction beam spot overlapping the optical aperture as shown in FIG. 1 by adjusting the time for the optical aperture to be formed since the irradiation of the pre-beam and the time interval between the irradiation of the pre-beam and the irradiation of the reproduction beam. The former response time to the formation of an optical aperture can be known by previously testing a material to be used for the super-resolution film. The latter time interval is obtained by (the distance between the pre-beam light source and the reproduction light source)/(the linear velocity of the disk) and can thus be properly set. This method permits the super-resolution film to be formed of a material which has a slow response to the formation of an optical aperture and has conventionally considered inadequate for the super-resolution film.

Note that the initialization light source need not be provided when a material which shows a slow response to the formation of an optical aperture since the point of the irradiation of a reproduction beam but shows a fast response to the closing of the optical aperture after the passing of the reproduction beam.

According to this invention, super-resolution reproduction may be carried out by using an optical disk with a super-resolution film comprised of a field control film which is demagnetized by irradiation of a reproduction beam and a magnetization change film whose magnetization direction changes due to the influence of a magnetic field of the field control film.

A super-resolution reproduction method for this optical disk comprises a step of irradiating a polarized reproduction beam to change magnetizations of the field control film and the magnetization change film, thereby rotating the polarization plane of the polarized reproduction beam, and a step of detecting the polarized reproduction beam having been incident to the recording layer via the field control film and the magnetization change film, and reflected from the recording layer.

A description will be given of a case where a super-resolution film consists of, for example, the stack of a field control film 32 of perpendicular magnetization and a magnetization change film 33 of longitudinal magnetization as shown in FIG. 5. In this diagram, the directions of magnetization are indicated by arrows. Used as the field control film 32 is a perpendicular magnetization film such as garnet, rare earth-transition metal alloy and Co—Pt-based multilayer film. As the magnetization change film 33 is used a longitudinal magnetization film such as ferrite and Co-based alloy.

FIG. 6A is a diagram depicting the temperature (T) dependency of saturation magnetization (Ms) of the field control film 32. At the ambient temperature Ta (near the room temperature), the field control film 32 has a high saturation magnetization. The saturation magnetization of the field control film 32 drops as the temperature rises, and the film 32 loses its magnetization at the Curie point Tc.

When the magnetization of the field control film 32 is spatially uniform at the temperature Ta, the film 32 is substantially equivalent to an evenly-magnetized infinite flat plate and does not generate a magnetic field outside. When a reproduction beam is irradiated, the field control film 32 absorbs a part of the reproduction beam and increases its temperature. The temperature distribution of the field control film 32 accords to the intensity distribution (approximately a Gaussian distribution) of the reproduction beam. Therefore, the saturation magnetization Ms of the field control film 32 (represented by the perpendicular arrows to the film surface) exhibits a distribution as shown in FIG. 6B. Specifically, at the center of the spot, the temperature of the field control film 32 is increased to or above the Curie point and the film 32 is demagnetized. Because of such a magnetization distribution, the field control film 32 generates a magnetic field Hl outside.

Under the initial state with no reproduction beam irradiated, the magnetization of the magnetization change film 33 stacked on the field control film 32 is directed in the in-plane direction. However, a leak field Hl is produced from the field control film 32 with the irradiation of a reproduction beam. When this leak field Hl exceeds the coercive force, the magnetization of the magnetization change film 33 is changed toward the direction of Hl (nearly perpendicular direction) from the in-plane direction. When the reproduction beam passes and the field control film 32 is cooled, the magnetization of the magnetization change film 33 is directed in the in-plane direction again at the cooled position.

In this case, if linearly polarized light is used as a reproduction beam, the plane of polarization of the light is rotated in accordance with the direction of the magnetization of the magnetization change film 33 due to the Faraday effect. Further, an analyzer is provided in the reproduction optical system and the transmission axis of the analyzer is set coincident with the polarization plane of a polarized reproduction beam when the magnetization of the magnetization change film 33 is directed to the perpendicular direction. This is equivalent to an increase in transmittance of the super-resolution film with a stacked structure in the reproduction detection system.

FIG. 7 shows the relationship between the magnetic field Hl to be applied to the magnetization change film 33 and the transmittance of the magnetization change film 33. This relation permits super-resolution reproduction to be executed in the situation as shown in FIG. 1.

According to this invention, a super-resolution film comprised of a single-layer perpendicular magnetization film 32 may be used as shown in FIG. 8. This perpendicular magnetization film 32 is uniformly magnetized upward or downward with respect to the film surface for initialization. In the initial state, the polarization plane of the linearly polarized light is rotated in accordance with the direction of the magnetization of the perpendicular magnetization film 32 due to the Faraday effect. Further, an analyzer is provided in the reproduction optical system to set the intensity of the transmitted light low when the perpendicular magnetization film 32 is in the initial state. When the reproduction beam is irradiated, the temperature of the perpendicular magnetization film 32 rises and the film portion near the center of the spot is heated to or above the Curie point, thereby causing demagnetization. As this demagnetized area does not exhibit the Faraday effect, the transmittance of the polarized reproduction beam is high in the demagnetized area and low in the surrounding initialized area. A super-resolution reproduction operation can be implemented by using this demagnetized area as an optical aperture.

A longitudinal magnetization film may be used in place of the perpendicular magnetization film in FIG. 8. In either case, super-resolution reproduction can be accomplished by using a magnetization film whose Faraday rotation angle differs between the area where a polarized reproduction beam is irradiated and the area where no polarized reproduction beam is irradiated.

According to this invention, a super-resolution film having the stacked structure of a field control film 32 of perpendicular magnetization and a magnetization change film 33' which coupled to this film 32 by exchange coupling, as shown in FIG. 9, may be used. In this case, when the field control film 32 is initialized, the magnetization change film 33' receives exchange force from the field control film 32 and is magnetized in the same direction as the field control film 32. When a reproduction beam is irradiated on the super-resolution film with such a stacked structure, the temperature of the field control film 32 rises and the film portion near the spot center is heated to or above the Curie point, thereby causing demagnetization. The demagnetized area of the field control film 32 cannot generate exchange force to the magnetization change film 33'. Therefore, the direction of magnetization of the magnetization change film 33' in an area adjacent to the demagnetized area of the field control film 32 is set in the direction of the self-leaked magnetic field from the surrounding area (or the direction of an external magnetic field applied as needed). As the direction of magnetization differs between the area irradiated with a polarized reproduction beam and its surrounding area, super-resolution reproduction can be implemented on the same principle as has been discussed above.

In this case, after the reproduction beam passes, the magnetization of the field control film 32 is restored and so is the exchange force. Even without an initialization field applied, therefore, the direction of magnetization of the magnetization change film 33' returns to the original state. While the directions of magnetization of the field control film 32 and the magnetization change film 33' are set the same in FIG. 9, if a ferrimagnetic film is used as a magnetization change film, the sub-lattice magnetization is aligned so that the net magnetization may be directed in the opposite direction.

According to this invention, super-resolution reproduction may be carried out by using an optical disk which has a super-resolution film comprised of a photoconductive film which becomes conductive with irradiation of a reproduction beam, a switching film for producing an optical aperture when applied with an electric field equal to or greater than threshold strength, and a pair of conductive films for applying an electric field to the stack of the photoconductive film and the switching film.

Reproduction from this optical disk is executed by using an optical disk drive which comprises a power supply for applying the electric field to the stack of the photoconductive film and the switching film through the pair of conductive films, a reproduction light source for generating the reproduction beam, and a reproduction optical system for detecting a reproduction beam having been incident to the recording layer via the optical aperture formed in the switching film, and reflected from the recording layer.

A super-resolution reproduction method using this optical disk drive comprises a step of irradiating a reproduction beam to form an optical aperture in the switching film while applying an electric field to the s tack of the pho toconductive film and the switching film through the pair of conductive films, and a step of detecting a reproduction beam having been incident to the recording layer via the optical aperture and reflected from the recording layer.

A material for the photoconductive film is not particularly restricted, and, for example, a-Si may be used. A material for the switching film is not particularly restricted as long as i ts light transmittance varies with application of a voltage equal to or greater than the threshold value; for example, a liquid crystal may be used as the material.

Figure 10:
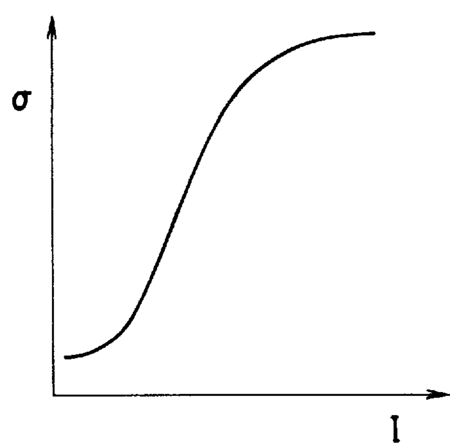
FIG. 10 is a diagram depicting the relationship between the conductivity of a photoconductive film which is used in this invention and the intensity of light to be irradiated.
Figure 11:
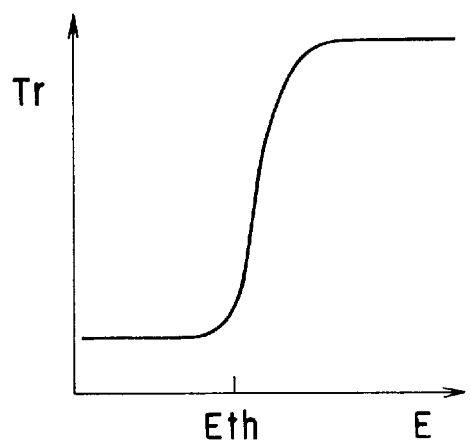
FIG. 11 is a diagram depicting the relationship between the light transmittance of a switching film which is used in this invention and the strength of an electric field to be applied.

FIG. 10 depicts the relationship between the conductivity (σ) of the photoconductive film and the intensity (I) of light to be irradiated. FIG. 11 shows the relationship between the light transmittance (Tr) of the switching film and the strength (E) of an electric field to be applied.

The conductivity observed for the photoconductive film is a photon mode. That is, while an area where the light intensity is low contains fewer photons to excite electrons to the conductive band so that the conductivity of the photoconductive film is low, the conductivity increases sharply as the light intensity becomes strong to a certain degree, and as the light intensity becomes higher, the conductivity is saturated. Light irradiation increases the conductivity of the photoconductive film such as a-Si at least by a factor of about four digits.

A description will now be given of a case where a liquid crystal is used for the switching film. When the electrical field strength is low, the liquid crystal molecules are aligned parallel to the film surface, obstructing light transmission. When the electrical field strength becomes equal to or greater than the threshold value, the liquid crystal molecules are aligned perpendicular to the film surface, facilitating light transmission. As shown in FIG. 11, therefore, the light transmittance of the switching film is low without no electrical field applied, whereas when the electrical field strength exceeds the threshold value ($E_{th}$), the light transmittance rapidly increases. As the electrical field strength becomes higher, the light transmittance of the switching film is saturated. Apparently, the liquid crystal shows a switching function to light transmission.

In this invention, a predetermined voltage (V) is applied to the photoconductive film and the switching film through the conductive films which sandwich the former two films. Given that $t_p$ is the thickness of the photoconductive film, $t_s$ is the thickness of the switching film, $\sigma_s$ is the conductivity of the photoconductive film and $\sigma_p$ is the conductivity of the photoconductive film, the voltage $V_s$ which is applied to the switching film is expressed by the following equation (1).

$$V_s=(t_s/\sigma_s)/(t_s/\sigma_s+t_p/\sigma_p)V \quad (1)$$

When no light is irradiated, $\sigma_p$ and $\sigma_s$ both have approximately same low values. Even if V is greater than the threshold value of the switching film, the voltage $V_s$ to be applied to the switching film can be set smaller than the threshold value by properly adjusting $t_s$ and $t_p$. At the time of light irradiation, $\sigma_p$ becomes greater by approximately a factor of four digits as compared with the case of no light irradiation as mentioned above, and $V_s$ is approximated to be nearly equal to V. If V is set equal to or greater than the threshold value of the switching film, the switching film becomes optically transparent.

The actual reproduction beam to be irradiated spatially shows a Gaussian distribution. In this case, it is possible to set only the near center of the reproduction beam spot in an ON state by properly adjusting the thickness of the photoconductive film and the reproduction power. That is, an optical aperture in the switching film can be made smaller than the size of the reproduction beam spot. Thus, super-resolution reproduction can be implemented in the state as illustrated in FIG. 2.

This invention can be adapted to a phase change optical disk like DVD, a magneto-optical disk, CD-ROM, CD-R, WORM and the like, and contributes to increasing the density of any of the optical disks.

Preferred embodiments of this invention will now be described with reference to the accompanying drawings.

First Embodiment

Figure 12:
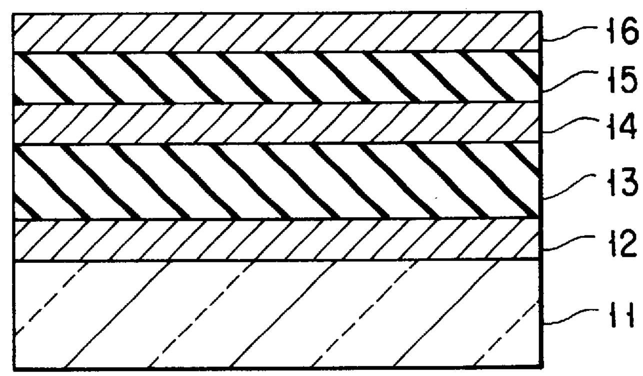
FIG. 12 is a cross-sectional view of an optical disk according to a first embodiment.

FIG. 12 represents the cross sectional view of an optical disk according to this embodiment. A substrate 11 is formed of polycarbonate, 120 mm in diameter and 0.6 mm in thickness, and grooves are so formed as to ensure land/groove recording at a track pitch of 0.6 μm. This polycarbonate substrate 11 is formed by ordinary injection molding. Formed on this substrate 11 are a super-resolution film 12 of As—Se—Ge with a thickness of 50 nm, a first interference film 13 of ZnS—$SiO_2$ with a thickness of 150 nm, a recording layer 14 of $Ge_2Sb_2Te_5$ with a thickness of 20 nm, a second interference film 15 of ZnS—$SiO_2$ with a thickness of 25 nm, and a reflective film 16 of Al with a thickness of 50 nm. Those films are formed by normal magnetron sputtering.

The transmission characteristic of the super-resolution film 12 will be discussed. The temperature dependency of the transmittance of the super-resolution film 12 becomes as indicated by the solid line in FIG. 3. This characteristic was measured by forming only the super-resolution film 12 on a quartz substrate and irradiating a laser beam of a wavelength of 650 nm. The transmittance of the super-resolution film 12 is low, about 50%, at an ambient temperature Ta (near the room temperature), rapidly increases from about 100° C., goes up to about 90% at about 150° C., and is saturated at a higher temperature.

Figure 14:
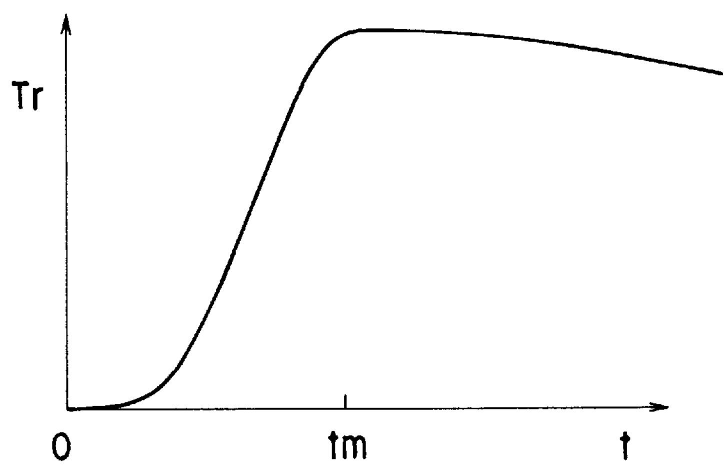
FIG. 14 is a diagram illustrating the time dependency of the transmittance of a super-resolution film in the first embodiment.

FIG. 14 shows the time response of the transmittance of the super-resolution film 12. This characteristic was acquired by checking a change in transmittance in situ after irradiating a laser beam of a wavelength of 650 nm to the super-resolution film 12 formed alone on a quartz substrate. The transmittance of the super-resolution film 12 is about 50% when no pulse is irradiated. The transmittance gradually increases after irradiation of the pulse, and reaches about 90% after 1 ms (tm) after the pulse irradiation. The subsequent attenuation response of the transmittance is relatively gentle, and a high transmittance is maintained for approximately 5 ms. The reason for the slow time response of the transmittance is because a change in transmittance of As—Se—Ge, the material for the super-resolution film 12, is caused by atomic movement. That is, it takes time for the atoms excited by light irradiation to change to another atomic arrangement from the one before light irradiation. As the new atomic arrangement is metastable, it gradually returns to the original state by thermal disturbance. As this response is also very slow, a high transmittance is kept for approximately 5 ms. Note that those responses can be made faster by, for example, heating the super-resolution film.

Figure 13:
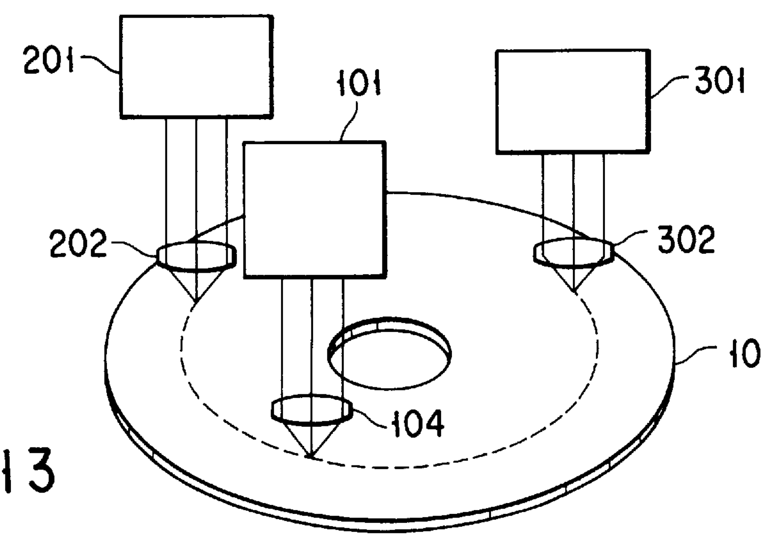
FIG. 13 is a diagram depicting the structure of an optical disk drive used in the first embodiment.

FIG. 13 shows an optical disk drive used to reproduce information from the optical disk 10 in FIG. 12. The broken line shown on the optical disk 10 indicates the locus of a reproduction beam. A reproduction light source 101 and an objective lens 104 for reproduction are provided above the optical disk 10. The reproduction light source 101 is also used as a recording light source. A pre-beam light source 201 and an objective lens 202 for a pre-beam are provided in front of the reproduction optical system, and an initialization light source 301 and an objective lens 302 for initialization at the back of the reproduction optical system. The initialization light source 301 and the initialization objective lens 302 do not have to be provided if the transmittance of the super-resolution film, after increased, returns to the original low state at a practically sufficient speed. The wavelengths of the pre-beam and reproduction beam are set to 650 nm, and the wavelength of the initialization beam is set to 830 nm, with their spots set substantially complete rounds whose full widths at half maximum (FWHM) are 0.5 μm. The interval between the irradiation positions of the pre-beam spot and the reproduction beam spot is set to 2 cm, and the interval between the irradiation positions of the reproduction beam spot and the initialization beam spot is set to 5 cm.

Recording and reproduction are carried out as follows by using this drive. The optical disk is rotated at a linear velocity of 10 m/s, and the reproduction (recording) light source 101 is driven with power of a high recording level to form a sequence of marks on the recording layer at mark pitches of 0.2 μm. Then, a pre-beam is irradiated as a series of high-frequency pulses on the track where the sequence of marks is formed, forming optical apertures in the super-resolution film at the proper intervals. Under this situation, a reproduction beam spot is irradiated for reproduction. At this time, the atoms of the super-resolution film are rearranged by the irradiation of the pre-beam spot, so that an optical aperture smaller in size than the spot is gradually formed in the super-resolution film. Because the interval between the irradiation positions of the pre-beam spot and the reproduction beam spot is adjusted in accordance with the linear velocity of the disk as mentioned above, the time from the irradiation of the pre-beam spot to the irradiation of the reproduction beam spot becomes 1 ms (the optimal time acquired from FIG. 14). When an optical aperture reaches the irradiation position of the reproduction beam spot, therefore, the transmittance of the super-resolution film 12 becomes a high value, about 90%, at which reproduction can be done at the most efficient timing. Therefore, marks with mark pitches of 0.2 μm, which cannot identified in the normal reproduction operation, can be reproduced at a high resolution.

Next, the optical aperture is closed by the irradiation of the initialization beam, so that repetitive reproduction can be carried out continuously. If the super-resolution reproduction operation is performed continuously on the same track without using the initialization beam, an optical aperture is not closed completely and is partially open for the time (about 10 ms) from the first reproduction to the next reproduction. In this case, repetitive reproduction gradually increases the size of the optical aperture from a predetermined value, thus lowering the resolution.

The foregoing description has been given with reference to the case where a material with such a property that the response of atomic rearrangement by light irradiation is slow is used for the super-resolution film. If a material with such a property that the response of temperature increase by light irradiation is slow is used for the super-resolution film, by contrast, the heating time should be elongated by using a beam extending longer in the track direction as the pre-beam spot. In this case, although the mark pitch in the track direction cannot be narrowed, an effect of narrowing the track pitch can be obtained.

Second Embodiment

Figure 15:
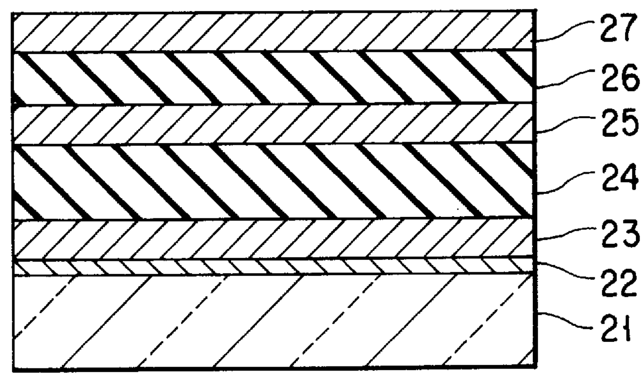
FIG. 15 is a cross-sectional view of an optical disk according to a second embodiment.

FIG. 15 represents the cross sectional view of an optical disk according to this embodiment. A substrate 21 is formed of polycarbonate, 120 mm in diameter and 0.6 mm in thickness, and grooves are so formed as to ensure land/groove recording at a track pitch of 0.6 μm. This polycarbonate substrate 21 is formed by ordinary injection molding. Formed on this substrate 21 are an $SiO_2$ film 22, a super-resolution film 23 of $Ge_2Sb_2Te_5$+5 at % Sb containing an element for reducing the melting point and crystallization temperature, a first interference film 24 of ZnS—$SiO_2$, a recording layer 25 of $Ge_2Sb_2Te_5$, a second interference film 26 of ZnS—$SiO_2$, and a reflective film 27 of Al. Those films are formed by normal magnetron sputtering. The $SiO_2$ film 22 is provided to prevent thermal damage on the substrate 21. The material for the super-resolution film 23 is a phase change material whose crystallization time is about 70 ns. A substrate (not shown) identical to the substrate 21 is adhered to the top of the reflective film 27. After an optical disk with the above structure is prepared, the recording layer is initialized to be crystalline by using an initialization device.

The temperature dependency of the transmittance of this super-resolution film becomes as indicated by the solid line in FIG. 3. This is because the transmittance in the initialized crystalline state is lower than that in an amorphous state. The evaluation of the transmittance characteristic when the super-resolution film is gradually heated up and cooled down does not show the behavior of the broken lines in FIG. 3. It is however predicted that in view of the crystallization time of the super-resolution film, the transmittance shows the characteristic as indicated by the broken lines in FIG. 3 if the linear velocity of the optical disk is fast and the cooling time is shorter than 70 ns.

Figure 16:
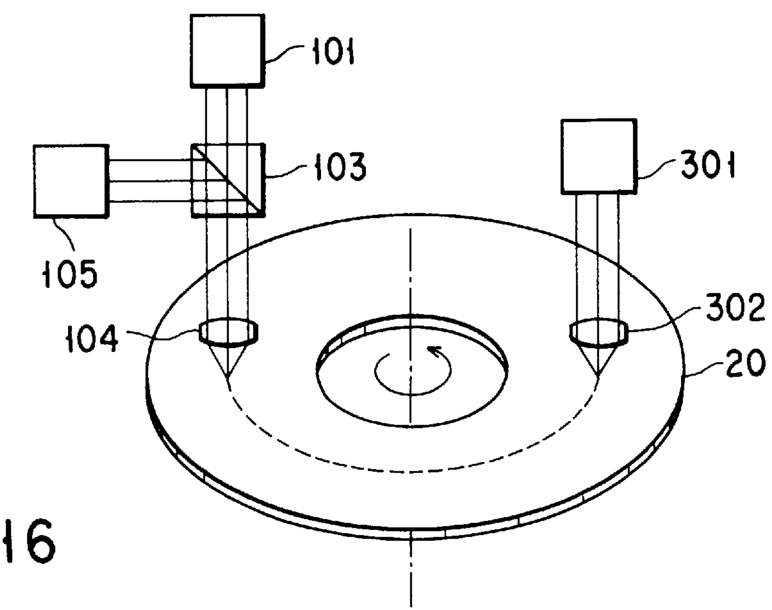
FIG. 16 is a diagram depicting the structure of an optical disk drive used in the second embodiment.

FIG. 16 shows an optical disk drive used to reproduce information from an optical disk 20 in FIG. 15. Provided above the optical disk 20 are a reproduction light source 101, a half mirror 103, an objective lens 104 for a reproduction beam, and a reproduction signal processing system 105. An initialization light source 301 and an objective lens 302 for initialization are provided at the back of the reproduction optical system. The reproduction beam in use has a wavelength of 685 nm, and the objective lens 104 in use has the numerical aperture NA of 0.6. A beam spot on the film surface is a complete round whose FWHM is approximately 0.5 μm. The linear velocity of the optical disk is set to 10 m/s. In this case, the time for the reproduction beam to pass the film surface is about 50 ns, shorter than the crystallization time of the super-resolution film 22. The wavelength of the initialization beam is set to 720 nm, and the objective lens 302 in use is an aspherical lens. The initialization beam spot on the film surface has an elliptical shape of about 2 μm in the track direction and about 1 μm in the track width direction. In this case, the time for the initialization beam to pass the film surface is about 200 ns.

Recording and reproduction are carried out as follows by using this drive. First, a series of recording marks on the recording layer are formed on the recording layer at mark pitches of 0.2 μm. Then, a reproduction beam is irradiated on the track where the recording marks are formed, while changing the power.

A description will now be given of a reproduction behavior when the initialization power is set to the optimal level and the reproduction power is gradually increased from 0.3 mW. Until the reproduction power becomes 0.6 mW, a reproduction signal is hardly detected. When the reproduction power becomes equal to or greater than 0.6 mW, CNR rapidly rises and shows the maximum value at the power of about 1 mW. As the reproduction power is increased further, CNR gradually falls down to a low CNR value equal to the one in the case of no super-resolution film. This phenomenon can be explained as follows. When the reproduction power is too low, an optical aperture is not formed in the super-resolution film, so that the amount of light reaching any recorded mark is too small to obtain a reproduction signal. When the proper reproduction power is used, by contrast, an optical aperture is formed. As a result, as shown in FIG. 1, only one of two recording marks existing in the spot can be reproduced efficiently. If the reproduction power is too high, a large optical aperture is formed so that two recording marks existing in the spot can not be identified separately.

If the same track is continuously reproduced without irradiation of the initialization beam, as a comparative example, the reproduction CNR is immediately attenuated to the level in the case where there is no super-resolution film. This is because the crystallization time of the phase change film used as a super-resolution film is longer than the pass time of the reproduction beam spot, leaving the aperture open.

For the purpose of comparison, a description will be given of reproduction of an optical disk which uses a phase change film of $Ge_1Sb_2Te_4$ with a short crystallization time, as a super-resolution film. Repetitive super-resolution reproduction can be performed on this optical disk without irradiating an initialization beam. If a super-resolution film of $Ge_2Sb_2Te_5$+5% Sb is used and super-resolution reproduction is carried out with irradiation of the initialization beam, by contrast, CNR of the reproduction signal is advantageously very large to ensure stable reproduction, as compared with the case of using the super-resolution film of $Ge_1Sb_2Te_4$. The reason for this advantage is that the super-resolution film of $Ge_2Sb_2Te_5$+5% Sb has a large change in transmittance between the crystalline state and the melting state.

According to this invention, as apparent from the above, the range of selectable materials for the super-resolution film is significantly widened, thus facilitating the optimization of parameters necessary for the super-resolution reproduction operation, such as the range of the transmittance change, the temperature range where the transmittance varies, and the number of repetition of reproduction operations. This can ensure super-resolution reproduction with a high signal quality and high reliability.

Third Embodiment

Figure 17:
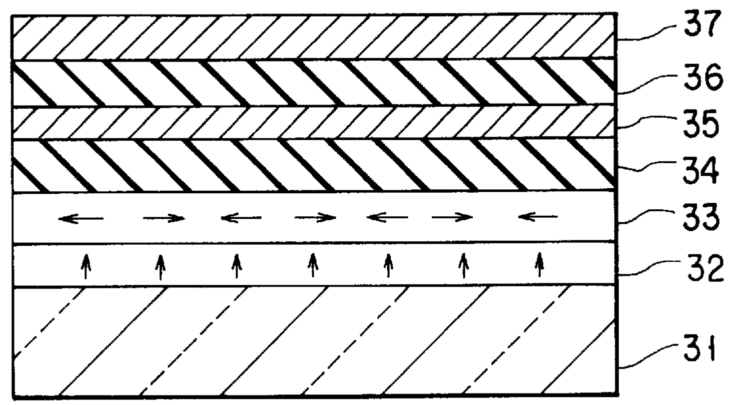
FIG. 17 is a cross-sectional view of an optical disk according to a third embodiment.

FIG. 17 shows the cross sectional view of an optical disk according to this embodiment. A glass substrate 31 with grooves is manufactured by a method of spin-coating a resist on a glass substrate, developing it with spiral exposure, etching the portion uncovered with the resist by reactive ion etching, thus forming grooves, then removing the resist. Formed on this substrate 31 are a field control film 32 of Bi-substituted garnet with a thickness of 100 nm, a magnetization change film 33 of Ba ferrite with a thickness of 100 nm, a first interference film 34 of ZnS—$SiO_2$ with a thickness of 150 nm, a recording layer 35 of $Ge_2Sb_2Te_5$ with a thickness of 20 nm, a second interference film 36 of ZnS—$SiO_2$ with a thickness of 25 nm, and a reflective film 37 of Al—Mo with a thickness of 50 nm. Those films are formed by normal magnetron sputtering. Because acquisition of a field control film and a magnetization change film which show predetermined characteristics requires that the substrate temperature at the time of forming the films should be set as high as 200° C., a glass substrate having a high heat resistance is used in this embodiment. It is to be noted that should the film forming technology be improved in the future to be able to form a field control film and a magnetization change film with predetermined characteristics at a lower temperature, an ordinary plastic substrate may be used.

The single-layer field control film shows the same temperature dependency of saturation magnetization Ms as illustrated in FIG. 6A. The saturation magnetization Ms at near the room temperature and the Curie point Tc are typically about 200 emu/cc and about 150° C., though they slightly depend on the film composition and the film forming conditions. The leak magnetic field Hl generated outside, when this field control film shows the magnetic distribution with demagnetization occurring at the center portion of the reproduction spot as shown in FIG. 6B, is calculated to be about 350 Oe at a maximum.

The single-layer magnetization change film shows the following light transmission characteristic that was acquired by checking the intensity of the transmission light by means of the optical system equipped with an analyzer with respect to the incident linearly polarized light. In this embodiment, the transmission axis of the analyzer is set substantially perpendicular to the oscillation plane of the incident polarized light to make the transmittance lower when the magnetization of the magnetization change film is directed in-plane direction. When the magnetization of the magnetization change film is directed in-plane direction, the Faraday rotational angle is about 0.1°, and the transmission light intensity is low. When a magnetic field of 300 oe (nearly the coercive force of the magnetization change film) or greater is applied perpendicularly to the magnetization change film, the magnetization of the magnetization change film is directed perpendicular to the film surface. As a result, the Faraday rotation angle becomes larger, and the transmission light intensity increases rapidly. By adjusting the angle of the transmission axis of the analyzer and the sensitivity of the differential detection system at this time, the transmission light intensity can be adjusted. For example, it is possible to acquire the characteristic as shown in FIG. 7 by setting the transmittance with the magnetization of the magnetization change film directed in-plane direction to 50% and setting the transmittance with the magnetization of the magnetization change film directed perpendicular direction to 80%.

Before setting the optical disk of FIG. 17 on the disk drive, an initialization magnetic field equal to or greater than the coercive force of the field control film (approximately 1.5 kOe) is applied perpendicularly to the optical disk to set the magnetization of the field control film uniform. As the easy axis of magnetization of the field control film is perpendicular to the film surface, perpendicular magnetization is maintained even after removing the magnetic field. When the initialization magnetic field is applied, the magnetization of the magnetization change film also becomes perpendicular to the film surface. Because the easy axis of magnetization of the magnetization change film is in the in-plane direction, however, the magnetization after removal of the magnetic field is randomly aligned in the in-plane direction.

Figure 18:
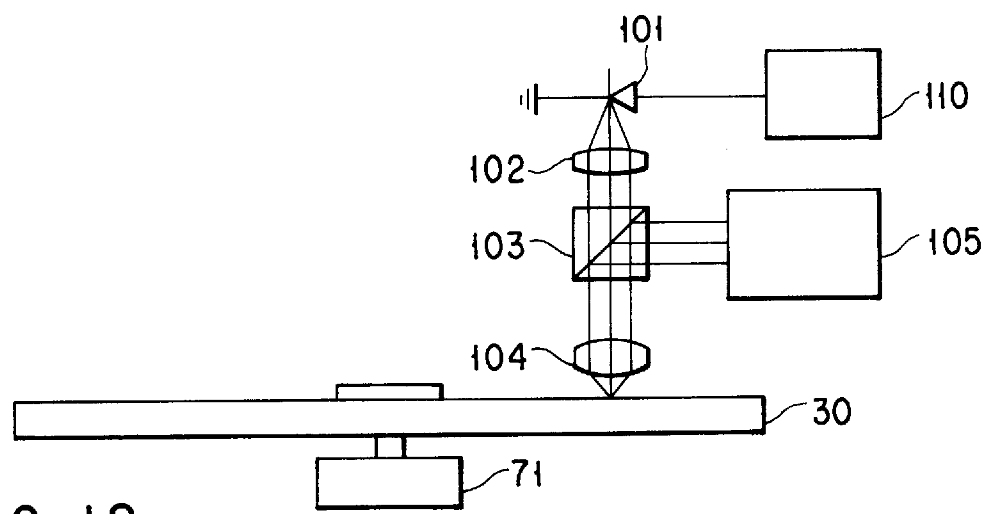
FIG. 18 is a diagram showing the structure of an optical disk drive used in the third embodiment.

FIG. 18 shows the essential structure of the optical disk drive used in this embodiment. Referring to FIG. 18, an optical disk 30 of FIG. 17 is set on the rotational shaft of a spindle motor 71. For information recording and reproduction, a laser 101 is driven by a light source control system 110 to irradiate a laser beam on the optical disk 30 via a first lens 102, a polarized beam splitter 103 and an objective lens 104. In the reproduction operation, reflected light from the optical disk 30, after having passed the objective lens 104 and the polarized beam splitter 103, is processed in the reproduction signal processing system 105 to read out recorded information.

First, the spindle motor 71 is activated to rotate the optical disk 30 at a linear velocity of 10 m/s, and a laser beam from the laser 101 is irradiated on the optical disk 30 to record information there. Specifically, the semiconductor laser is operated with a pulse train of such a frequency as to set the mark pitches of 1 μm over a predetermined track to form a series of recording marks there. Then, the semiconductor laser is moved over another track and is operated with a pulse train of such a frequency as to set the mark pitches of 0.9 μm over a predetermined track to form a series of recording marks there. A sequence of recording marks are formed in this manner by changing the recording frequency in such a way as to make the mark pitches shorter by 0.1 μm from 1 μm to 0.1 μm while shifting a track to be recorded. At this time, overwrite recording is performed on both lands and grooves. As higher power is applied in recording operation than in reproduction operation, the temperature of the field control film in the area of a size equal to or greater than FWHM of the beam spot becomes equal to or higher than Tc. Accordingly, the area of the magnetization change film which has a size equal to or greater than FWHM of the beam spot is also magnetized perpendicularly. As a result, the super-resolution film with the stacked structure becomes transparent, and recording marks equivalent to those formed in the case of no super-resolution film used can be formed. The size of marks becomes about 0.5 μm, approximately the same as FWHM of the spot, in the track width direction, and has a length in the track direction which is determined by the FWHM of the spot and the recording pulse length. To make the mark pitches shorter than FWHM of the spot, pen-tip recording should be made so that the size in the track width direction should become smaller than 0.5 μm.

Reproduction is carried out as follows. The following discusses reproduction in the case where a series of recording marks are formed at pitches of 0.2 μm. CNR of a reproduction signal obtained by continuously oscillating the laser to gradually increase the reproduction power from 0.5 mW by 0.1 mW varies as follows. CNR gradually increases from the point where the reproduction power is about 0.5 mW, sharply rises and reaches a practical value at about 1 mW, and keeps its value until approximately 1.5 mW. CNR gradually falls when the reproduction power exceeds about 1.5 mW, and is hardly obtained at about 2.5 mW. The reason for this behavior can be explained as follows. When the reproduction power becomes about 0.5 mW, the temperature of the field control film near the center of the spot becomes equal to or greater than the Curie point and an optical aperture is formed in the magnetization change film at the center of the spot, so that a reproduction signal is obtained. When the reproduction power is in the range of about 1 mW to about 1.5 mW, an optical aperture of the proper size is formed in the magnetization change film, ensuring efficient super-resolution reproduction of a series of recording marks at pitches of 0.2 μm. When the reproduction power exceeds about 1.5 mW, however, an optical aperture becomes too large so that signals are picked up from adjacent marks and CNR starts falling. When the reproduction power further increases and becomes about 2.5 mW, an aperture of a size of about FWHM of the laser spot is formed, making it impossible to separately reproduce two recording marks formed at a pitch of 0.2 μm.

When the mark pitch is wider than 0.2 μm, CNR does not drop so much even if the reproduction power is increased above 1.5 mW. The slight decrease in CNR occurs because when reproduction is done with high power, an optical aperture becomes large so that recording marks on adjacent tracks are picked up.

Figure 19:
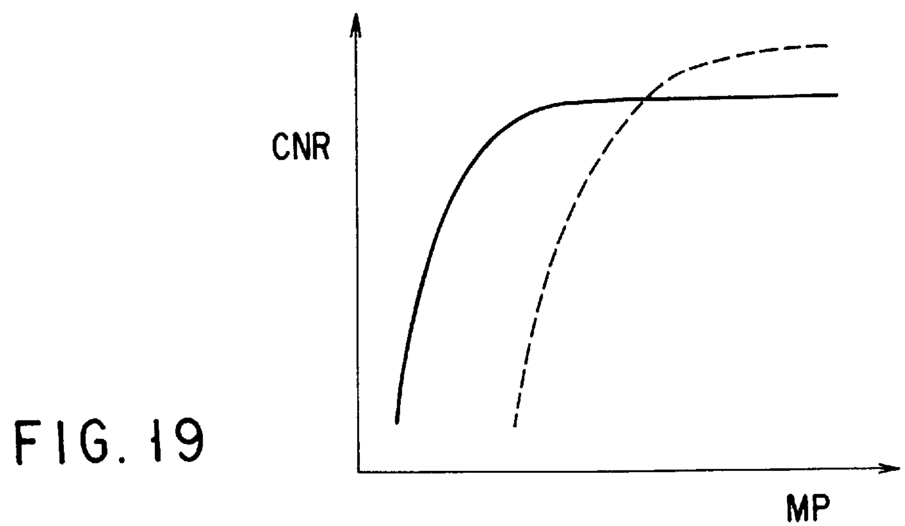
FIG. 19 is a diagram illustrating the relationship between the recorded mark pitch and CNR for the optical disk of the third embodiment.

FIG. 19 illustrates the relationship between the mark pitch (MP) and CNR when reproduction is carried out with the reproduction power fixed to 1.2 mW. In FIG. 19, the broken line shows the relationship for the conventional optical disk without a super-resolution film, while the solid line shows the relationship for the optical disk of this embodiment. With regard to the conventional optical disk, for the mark pitch of 0.4 μm or smaller, CNR drops drastically due to the influences of inter-symbol interference and crosstalk. By contrast, the optical disk of this embodiment shows a high CNR even when the mark pitch is reduced to 0.2 μm. When the mark pitch is large, CNR of the conventional optical disk is slightly higher than that of the optical disk of this embodiment because the conventional optical disk has no super-resolution film and a high efficiency of using the reproduction beam.

Although the foregoing description has been of the case where a perpendicular magnetization film is used as a field control film and a longitudinal magnetization film is used as a magnetization change film, this invention is not limited to this particular case.

For example, a longitudinal magnetization film may be used as a field control film in which case, a ring magnet or a ring recording magnetic pole used for a magnetic disk is used to uniformly initialize the field control film along the tracks. When the field control film formed of the longitudinal magnetization film is heated to be demagnetized with irradiation of the reproduction beam, it is possible to generate a greater magnetic field than the one produced by the field control film which is comprised of a perpendicular magnetization film. Even if the coercive force of the magnetization change film is large, therefore, super-resolution reproduction is still possible.

Further, a perpendicular magnetization film may be used as a magnetization change film. In this case, the magnetization of the magnetization change film is initialized upward or downward to the film surface. Furthermore, the transmission axis of the analyzer is so set that the transmittance of the polarized reproduction beam in the initial state becomes low. When the field control film is heated to be demagnetized with irradiation of the reproduction beam, this field control film generates a magnetic field in the opposite direction to the initial magnetization direction of the magnetization change film. Super-resolution reproduction can be accomplished by inverting the direction of the magnetization of the magnetization change film in the reproduction operation in this manner. In this case, the direction of the magnetization of the magnetization change film, which has been inverted by the reproduction operation, is held unchanged. To repeatedly execute the super-resolution reproduction operation, therefore, an initialization magnet is provided at the back of the reproduction light source to restore the direction of the magnetization of the magnetization change film.

If an optical aperture smaller in size than FWHM of the beam spot is formed in the magnetization change film at the time of irradiating a high-power recording beam as well as in the reproduction operation, it is possible to form a series of recording marks smaller than the recording beam spot, thus ensuring super-resolution recording. This method can further improve the recording density as compared with the case where only super-resolution reproduction is conducted. In this case, however, an optical aperture in the reproduction operation becomes very small and efficiency light usage decreases, which reduces the intensity of a reproduced signal.

Fourth Embodiment

Figure 20:
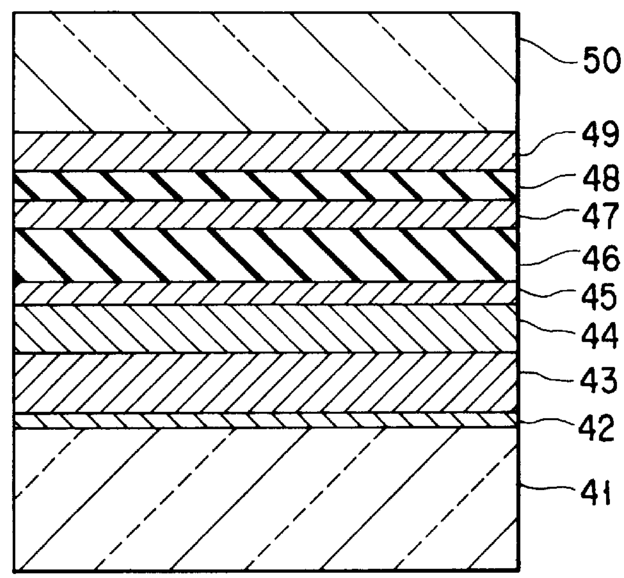
FIG. 20 is a cross-sectional view of an optical disk according to a fourth embodiment.

FIG. 20 shows the cross sectional view of an optical disk according to this embodiment. A substrate 41 is formed of polycarbonate, 120 mm in diameter and 0.6 mm in thickness, with grooves so formed as to ensure land/groove recording. Formed on this substrate 41 are a first electrode film 42 of ITO, a switching film 43 of a liquid crystal, a photoconductive film 44 of a-Si, a second electrode film of ITO, a first interference film 46 of ZnS-$SiO_2$, a recording layer 47 of GeSbTe, a second interference film 48 of ZnS—$SiO_2$, and a reflective film 49 of Al—Mo. A glass substrate 50 of the same size as the polycarbonate substrate 41 is provided on the reflective film 49. The materials for the upper and lower substrates may be reversed.

This optical disk can be prepared by the following method. The first electrode film 42 is formed on the polycarbonate substrate 41 by sputtering. To lead out the first electrode, a mask is provided at the innermost periphery of the disk to expose an electrode leading portion, and a lead is formed by sputtering Au there. After the reflective film 49, the second interference film 48, the recording layer 47, the first interference film 46 and the second electrode film 45 are formed on the glass substrate 50 by sputtering, the photoconductive film 44 is formed by CVD. To lead out the second electrode, a mask is provided at the innermost periphery of the disk to expose an electrode leading portion, and a lead is formed by sputtering Au there. Then, the polycarbonate substrate 41 and the glass substrate 50 are placed against each other so that the first electrode film 42 faces the photoconductive film 44, a liquid crystal is injected between both substrates, and both substrates are then adhered by using the inner peripheral portion and outer peripheral portion where no films are formed. At the time of adhering the substrates, a care should be taken not to short-circuit the lead of the first electrode film 42 with the lead of the second electrode film 45. When the disk is set on the drive, the individual leads should be connected to terminals provided at a disk holder.

The terminals provided at the disk holder are supplied via sliding contacts with the voltage from a power supply provided in the drive, thereby applying a voltage between the two electrode films. The applied voltage typically lies in the range of several volts to several scores of volts, though it differs depending on the type and thickness of the liquid crystal.

When the drive can withstand a high voltage, a voltage of an order of several kilovolts may be applied from outside the disk. When the external voltage is applied, the electrode films, the leads and the associated contacts can be omitted. For example, a relatively thick ITO film is formed on the glass substrate and is placed on the reproduction-beam incident side, an ordinary metal electrode is provided on the opposite side to the disk, and a voltage of several kilovolts is applied between both films. As a predetermined electrical field has only to be applied to the photoconductive film and the switching film within the reproduction beam spot, the electrode may be made considerably smaller.

It is preferable to make the liquid crystal as thin as 1 $\mu$m though its thickness is not particularly restricted. It is to be noted however that even when the liquid crystal is thicker than the depth of focus of the reproduction beam, only the liquid crystal in the portion where the photoconductive film is enabled can be made transparent as long as the focal point lies on the photoconductive film. The thickness of the liquid crystal to that of the photoconductive film are set optimally based on the equation (1). When the liquid crystal in use is of an STN type and a lightly-doped a-Si film is used as the photoconductive film, for example, the ratio of the thickness of the liquid crystal to that of the photoconductive film should be set to approximately 10:1. With the liquid crystal having a thickness of 1 $\mu$m, for example, the photoconductive film should be formed as thin as 100 nm.

The following will discuss the results of previously having examined the characteristic in FIG. 10 with respect to a single-layer photoconductive film sandwiched by a pair of ITO electrodes. Specifically, with a voltage applied between the ITO electrodes, a beam in 50 $\mu$m in diameter with a uniform intensity was irradiated from an He—Ne laser and a change in current or conductivity was checked as the power was gradually increased while monitoring the circuit current. The conductivity when no light is irradiated is $10^{-5}$ S/cm, which gradually increases in accordance with an increase in laser power, sharply rises at about 10 W, and reaches a saturation value of $10^{-1}$ S/cm at about 15 W. The spot size of the laser beam in actual use is about 0.5 μm in terms of FWHM of the spot. The aforementioned value of 10 W with 50 μm in diameter is equivalent to 1 mW in terms of the actual reproduction power.

FIG. 11 shows a variation in the light transmittance of a single layer of a liquid crystal (thickness of 1 μm) sandwiched by a pair of ITO electrodes while gradually increasing the applied voltage. The transmittance when no voltage is applied is approximately 40%. The threshold voltage at which the transmittance starts increasing is about 5 V (the electrical field strength is 50 kV/cm). when the applied voltage becomes about 7 V, the transmittance reaches a saturation value of about 80%.

Figure 21:
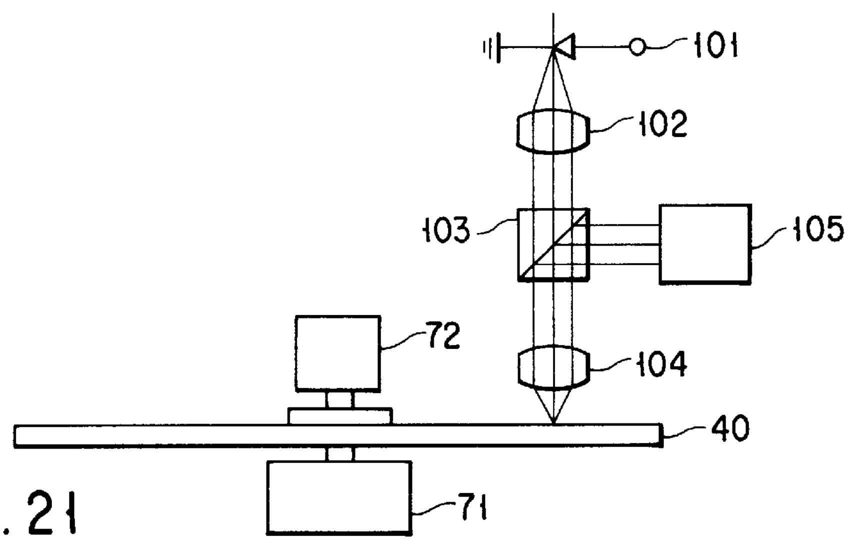
FIG. 21 is a diagram depicting the structure of an optical disk drive used in the fourth embodiment.

FIG. 21 shows the essential structure of the optical disk drive used in this embodiment. Referring to FIG. 21, an optical disk 40 in FIG. 20 is attached to the disk holder of the rotational shaft of the spindle motor 71. The disk holder is provided with terminals to be connected to the leads of the electrode films of the disk. The leads from the first and second electrode films of the disk are respectively connected to the terminals provided on the disk holder, and further connected to a voltage source 72 via sliding contacts. For information recording and reproduction, as in FIG. 18, the laser 101 is driven by the light source control system 110 to irradiate a laser beam on the optical disk 40 via the first lens 102, the polarized beam splitter 103 and the objective lens 104. With regard to reproduction, reflected light from the optical disk 40, after having passed the objective lens 104 and the polarized beam splitter 103, is processed in the reproduction signal processing system 105 to read out recorded information.

First, the optical disk is set in the initialization device to crystallize the GeSbTe film of the recording layer. The spindle motor 71 is activated to rotate the optical disk 40 at a linear velocity of 10 m/s, and a laser beam from the laser 101 is irradiated on the optical disk 40 to record information there. Specifically, the semiconductor laser is operated with a pulse train of such a frequency as to set the mark pitches of 1 μm over a predetermined track to form a series of recording marks there. Then, the semiconductor laser is moved over another track and is operated with a pulse train of such a frequency as to set the mark pitches of 0.9 μm over a predetermined track to form a series of recording marks there. A sequence of recording marks are formed in this manner by changing the recording frequency in such a way as to make the mark pitches shorter by 0.1 μm from 1 μm to 0.1 μm while shifting a track to be recorded. At this time, overwrite recording is performed on both lands and grooves. As higher power is applied in recording operation than in reproduction operation, the photoconductive film has a high conductivity in the area of a size equal to or greater than FWHM of the beam spot. Accordingly, the area of the switching film which has a size equal to or greater than FWHM of the beam spot likewise becomes transparent, allowing the formation of recording marks identical to those formed in the case where no super-resolution film is used. The size of recording marks becomes about 0.5 μm, approximately the same as FWHM of the spot, in the track width direction, and has a length in the track direction which is determined by FWHM of the spot and the recording pulse length. To make the mark pitches shorter than FWHM of the spot, pen-tip recording should be made so that the size in the track width direction should become smaller than 0.5 μm.

Figure 22:
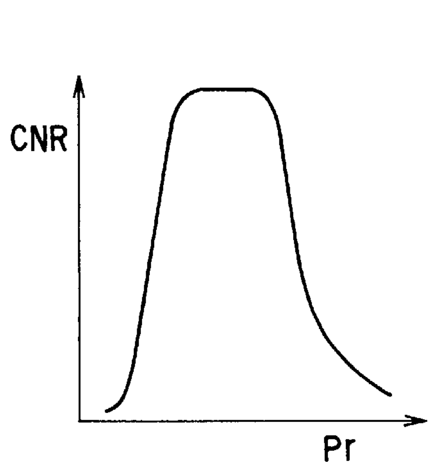
FIG. 22 is a diagram illustrating the relationship between reproduction power and reproduction CNR for the optical disk of the fourth embodiment.

Reproduction is carried out as follows. The following discusses reproduction in the case where a series of recording marks are formed at pitches of 0.2 μm. FIG. 22 shows a change in CNR of a reproduction signal acquired by continuously oscillating the laser to gradually increase the reproduction power from 0.5 mW by 0.1 mW. CNR gradually increases from the point where the reproduction power is about 0.5 mW, sharply rises and reaches a practical value at about 1 mW, and keeps its value until approximately 1.5 mW. CNR gradually falls when the reproduction power exceeds about 1.5 mW, and is hardly obtained at about 2.5 mW. The reason for this behavior can be explained as follows. When the reproduction power becomes about 0.5 mW, the conductivity of the photoconductive film starts increasing. When the reproduction power lies in the range of about 1 mW to about 1.5 mW, an optical aperture of the proper size is formed, ensuring efficient super-resolution reproduction of a series of recording marks at pitches of 0.2 μm. When the reproduction power exceeds about 1.5 mW, however, an optical aperture becomes too large so that signals are picked up from adjacent marks and CNR starts falling. When the reproduction power further increases and becomes about 2.5 mW, an aperture of a size of about FWHM of the laser spot is formed, making it impossible to separately reproduce two recording marks formed at a pitch of 0.2 μm.

When the mark pitch is wider than 0.2 μm, CNR does not drop so much even if the reproduction power is increased above 1.5 mW. The slight decrease in CNR occurs because when reproduction is done with high power, an optical aperture becomes large so that recording marks on adjacent tracks are picked up.

Figure 23:
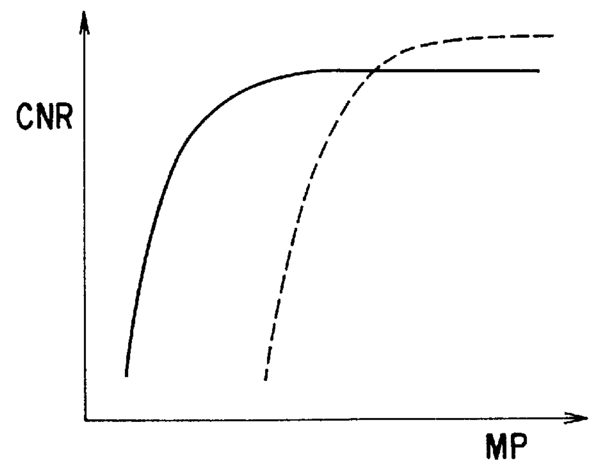
FIG. 23 is a diagram illustrating the relationship between the recorded mark pitch and CNR for the optical disk of the fourth embodiment.

FIG. 23 illustrates the relationship between the recorded mark pitch (MP) and CNR when the reproduction power is fixed to 1.2 mW. In FIG. 23, the broken line shows the relationship for the conventional optical disk without a super-resolution film, while the solid line shows the relationship for the optical disk of this embodiment. With regard to the conventional optical disk, for the mark pitch of 0.4 μm or smaller, CNR drops drastically due to the influences of inter-symbol interference and crosstalk. By contrast, the optical disk of this embodiment shows a high CNR even when the mark pitch is reduced to 0.2 μm. When the mark pitch is large, CNR of the conventional optical disk is slightly higher than that of the optical disk of this embodiment because the conventional optical disk has no super-resolution film and a high efficiency of using the reproduction beam. However, this embodiment can also acquire practically sufficiently high CNR by optimizing the film structure.

When the time response of the photoconductive film or the switching film is too slow to close an optical aperture after the passing of the reproduction beam, the film should be initialized by providing, at the back of the reproduction light source, some means for applying an electrical field in the opposite direction. This design can implement stable repetitive reproduction.

If an optical aperture smaller in size than FWHM of the beam spot is formed even when irradiating a high-power recording beam, it is possible to form a series of recording marks smaller than the recording beam spot, thus ensuring super-resolution recording. This method can improve the recording density more than is done in the case where only super-resolution reproduction is performed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. An optical disk drive for reproducing an optical disk having a recording layer and a super-resolution film provided on a reproduction-beam incident side with respect to said recording layer, said super-resolution film being formed of such a material that an optical aperture formed by irradiation of a reproduction beam remains after said reproduction beam passes, said optical disk drive comprising:

a reproduction light source for generating said reproduction beam;

a reproduction optical system for detecting a reproduction beam having been incident to said recording layer via said optical aperture formed in said super-resolution film, and reflected from said recording layer; and an initialization light source, provided at a back of said reproduction light source in a track direction of said optical disk, for generating an initialization beam for closing said optical aperture remaining on said super-resolution film.

2. The optical disk drive according to claim 1, wherein an initialization beam spot has an elliptical shape along the track direction.

3. The optical disk drive according to claim 1, wherein said super-resolution film is formed of a phase change material.

4. The optical disk drive according to claim 1, wherein said super-resolution film is formed of a chalcogen-based material.

5. The optical disk drive according to claim 1, further comprising a pre-beam light source, provided in front of said reproduction light source in a track direction of said optical disk, for generating a pre-beam for forming an optical aperture remaining in said super-resolution film.

6. The optical disk drive according to claim 5, wherein a pre-beam spot has an elliptical shape along the track direction.

7. The optical disk drive according to claim 1, wherein said optical aperture formed in said super-resolution film has a higher transmittance than the other regions in said super-resolution film.

8. The optical disk drive according to claim 1, wherein said optical recording layer is formed of a phase change material.

* * * * *